United States Patent
Moon (10) Patent No.: US 12,152,638 B2
(45) Date of Patent: Nov. 26, 2024

(54) POWER TRANSMISSION DEVICE OF STEERING APPARATUS

(71) Applicant: HL MANDO CORPORATION, Pyeongtaek-si (KR)

(72) Inventor: Sungjune Moon, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 472 days.

(21) Appl. No.: 17/512,877

(22) Filed: Oct. 28, 2021

(65) Prior Publication Data

US 2022/0136564 A1   May 5, 2022

(30) Foreign Application Priority Data

Oct. 30, 2020   (KR) .................. 10-2020-0143517

(51) Int. Cl.
```
F16D 3/12    (2006.01)
B62D 5/04    (2006.01)
F16D 3/76    (2006.01)
```

(52) U.S. Cl.
CPC ............. *F16D 3/12* (2013.01); *B62D 5/0403* (2013.01); *F16D 3/76* (2013.01); *B62D 5/0409* (2013.01); *F16D 2300/22* (2013.01)

(58) Field of Classification Search
CPC .......... F16D 3/12; F16D 3/76; F16D 2300/22; B62D 5/0403; B62D 5/0409

USPC ...................................................... 464/89–91
See application file for complete search history.

(56) References Cited

U.S. PATENT DOCUMENTS

| | | | | |
|---|---|---|---|---|
| 2,250,448 A | * | 7/1941 | Edwards ................... | F16D 3/50 464/89 |
| 5,606,890 A | * | 3/1997 | Luckas ..................... | F16D 3/68 464/89 |
| 2012/0322566 A1 | * | 12/2012 | Kim ......................... | F16D 3/76 464/88 |

FOREIGN PATENT DOCUMENTS

FR          748.102      *   6/1933   ...................... 464/89

* cited by examiner

*Primary Examiner* — Greg Binda
(74) *Attorney, Agent, or Firm* — Hauptman Ham, LLP (57) ABSTRACT

A power transmission device of a steering apparatus includes a first coupling member, a second coupling member, and an intermediate member. The first coupling member includes a first large-diameter portion that radially protrudes and a first coupling hole formed at the central portion of the first coupling member. The second coupling member includes a second large-diameter portion radially protruding at a location corresponding to the first large-diameter portion and a second coupling hole formed in the central portion of the second coupling member. The intermediate member includes an insertion end coupled between the first large-diameter portion and the second large-diameter portion and an elastic protrusion that is elastically deformable. The intermediate member is coupled between the first and second coupling members.

17 Claims, 11 Drawing Sheets

POWER TRANSMISSION DEVICE OF STEERING APPARATUS

CROSS-REFERENCE TO RELATED APPLICATION

This application claims the priority benefit of Korean Patent Application No. 10-2020-0143517, filed on Oct. 30, 2020 in the Korean Intellectual Property Office, the disclosure of which is incorporated herein by reference in its entirety.

BACKGROUND

Field of the Disclosure

The present disclosure relates to power transmission devices of steering apparatuses. More specifically, the present disclosure relates to a power transmission device of a steering apparatus capable of: compared to a conventional power transmission device, accurately transferring rotational force from a first shaft to a second shaft while maintaining rigidity without vibration or noise; absorbing vibration and noise caused by heat or impact; and enhancing durability.

Description of the Background

In general, a steering apparatus of a vehicle is an apparatus for enabling a driver to change a direction in which the vehicle travels by turning a steering wheel. The vehicle steering apparatus is an assist apparatus for assisting the driver to steer the vehicle in a direct ion in which the driver desires to travel by allowing the center of rotation around which the front wheels of the vehicle rotate to be changed by a desired angle. In such a steering system, an electrical power assisted steering apparatus is used as an assist power mechanism for relieving driver' force needed to turn the steering wheel.

The electrical power assisted steering apparatus has a structure of detecting the rotation of the steering wheel and driving a motor that is installed on a rack or a steering shaft for assisting the rotational movement, thereby, enabling the steering apparatus to effectively operate.

However, in the power transmission device in such a conventional electrical power assisted steering apparatus, a massive impact can be reversely transferred passing through the steering shaft in a situation where durability is degraded as the power transmission device is used over a certain time, or when driving on a road, for example, off-road driving. Thereby, there have been disadvantages of increasing noise, abrasion and play due to the contact.

In particular, the conventional power transmission device has suffered from some disadvantages, such as, the increase of rattle noise and noisy sound, the decrease of rigidity, and the like due to aging, abrasion, permanent compression, and the like caused by high temperature in the power transmission device after the durability is degraded.

SUMMARY

To address these issues, embodiments of the present disclosure provide a power transmission device of a steering apparatus that is capable of: compared to the conventional power transmission device, transferring rotational force from a first shaft to a second shaft while maintaining rigidity without vibration or noisy sound; absorbing noise caused by heat or impact; and enhancing durability.

Objects of the present disclosure are not limited thereto, and other objects may be clearly understood by those skilled in the art from description below.

According to aspects of the present disclosure, a power transmission device of a steering apparatus is provided that includes a first coupling member that includes a first large-diameter portion that radially protrudes, and a first coupling hole formed at the central portion of the first coupling member, and is coupled to either one of a first shaft and a second shaft; a second coupling member that includes a second large-diameter portion radially protruding at a location corresponding to the first large-diameter portion, and a second coupling hole formed in the central portion of the second coupling member, and is coupled to the other of the first shaft and the second shaft; an intermediate member that includes an insertion end coupled between the first large-diameter portion and the second large-diameter portion, and an elastic protrusion that is located on an axial end face of the intermediate member, supported by the inner surface of the first coupling member, and elastically deformable, and is coupled between the first and second coupling members.

According to embodiments of the present disclosure, it is possible to provide power transmission devices of steering apparatus that are capable of: compared to the conventional power transmission device, transferring rotational force from a first shaft to a second shaft while maintaining rigidity without vibration or noisy sound; absorbing noise caused by heat or impact; and enhancing durability.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings:

FIG. 4 to FIG. 6 is a perspective view of an intermediate member of the power transmission device of the steering apparatus according to aspects of the present disclosure;

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
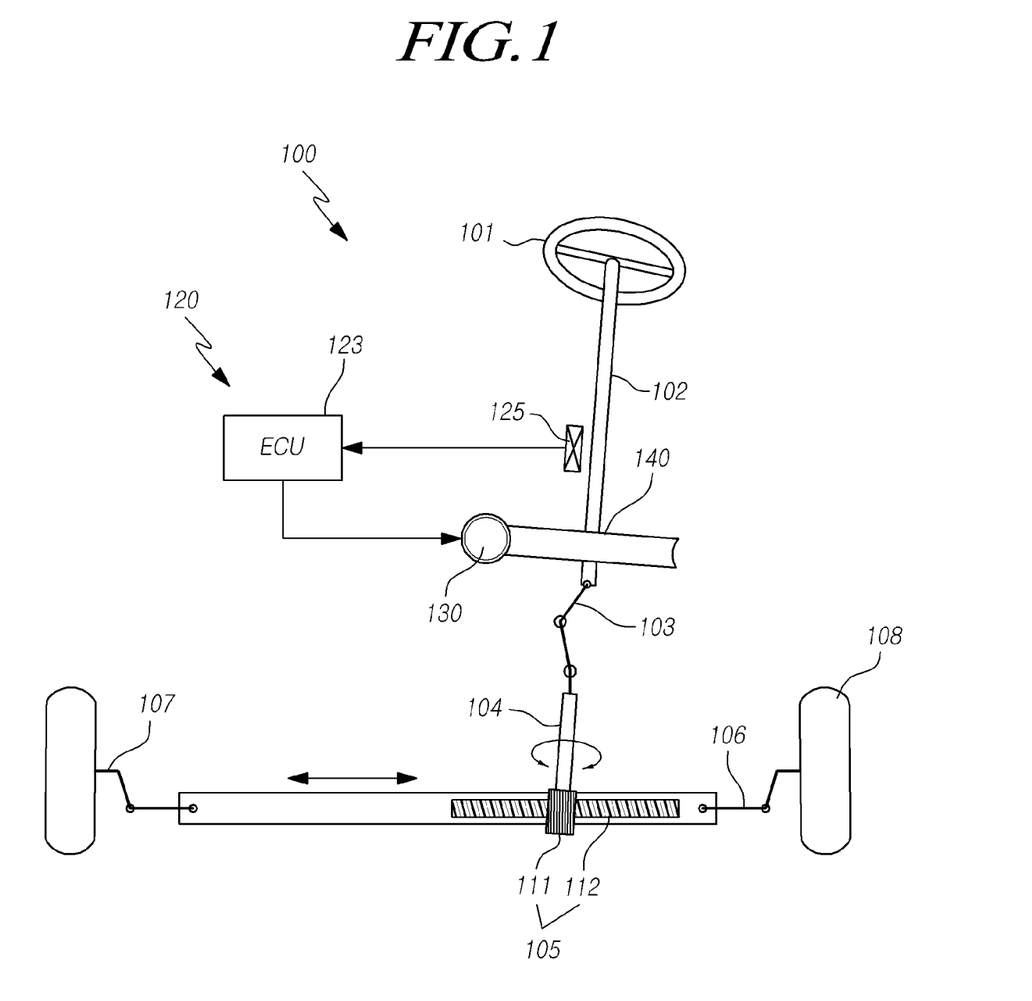
FIG. 1 schematically illustrates a steering apparatus according to aspects of the present disclosure.
Figure 2:
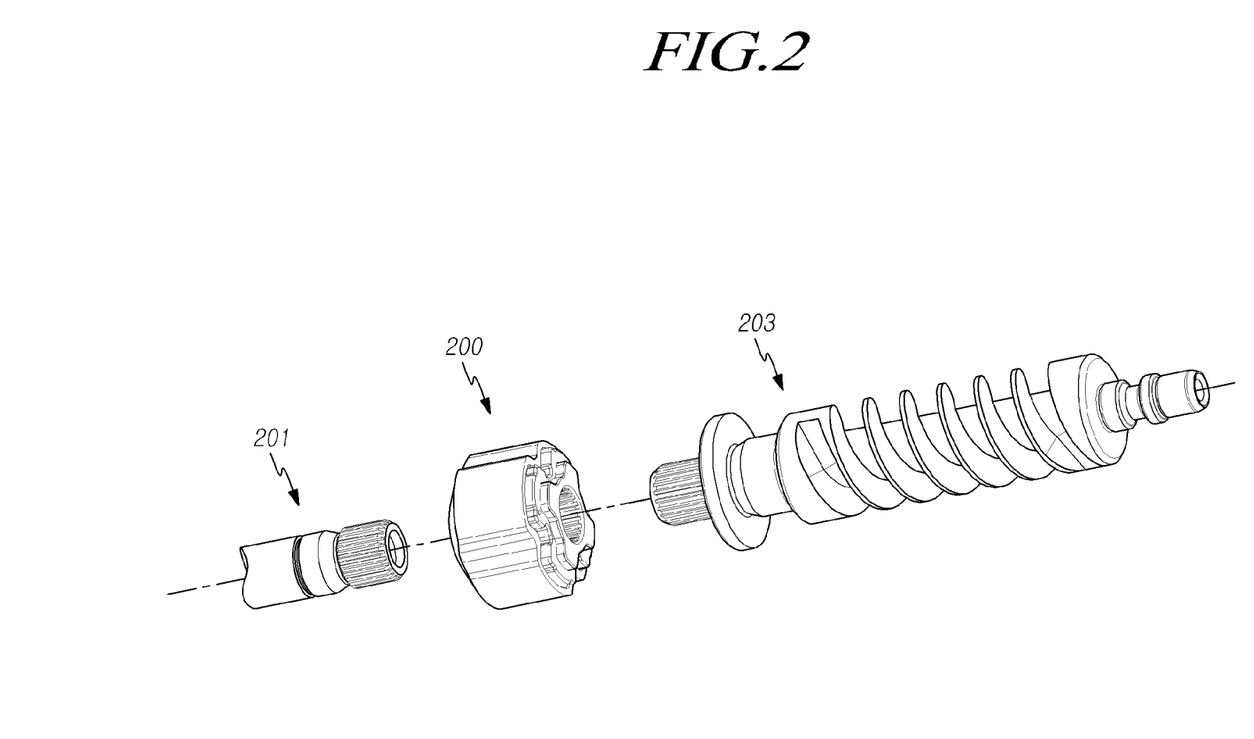
FIG. 2 is an exploded perspective view of a power transmission device of the steering apparatus according to aspects of the present disclosure.
Figures 3A, 3B:
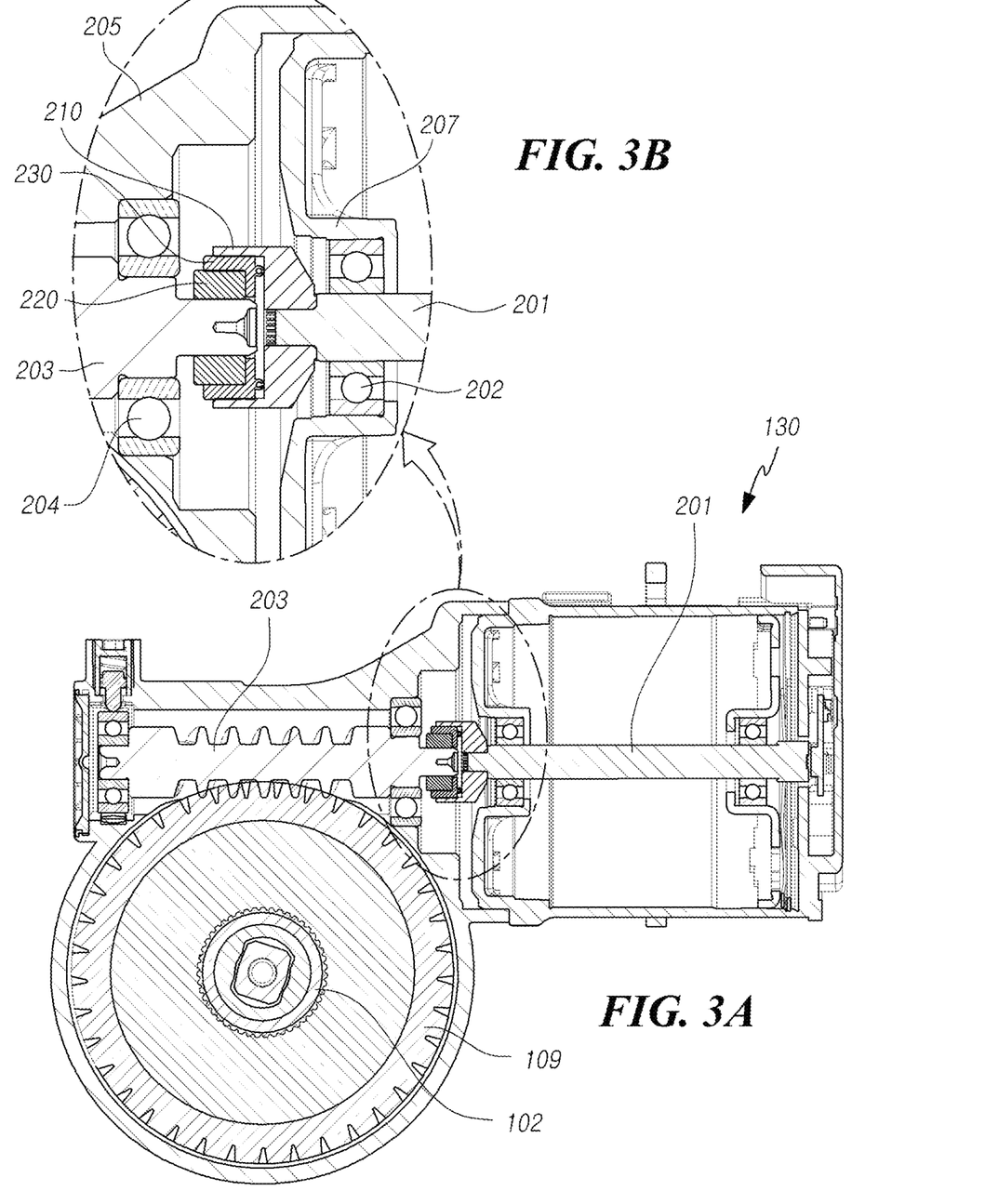
FIG. 3A is a cross-sectional view of a motor with the power transmission device of the steering apparatus according to aspects of the present disclosure.
FIG. 3B is an enlarged view of a portion of the cross-sectional view of the motor with the power transmission device of the steering apparatus as shown in FIG. 3A according to aspects of the present disclosure.
Figure 4:
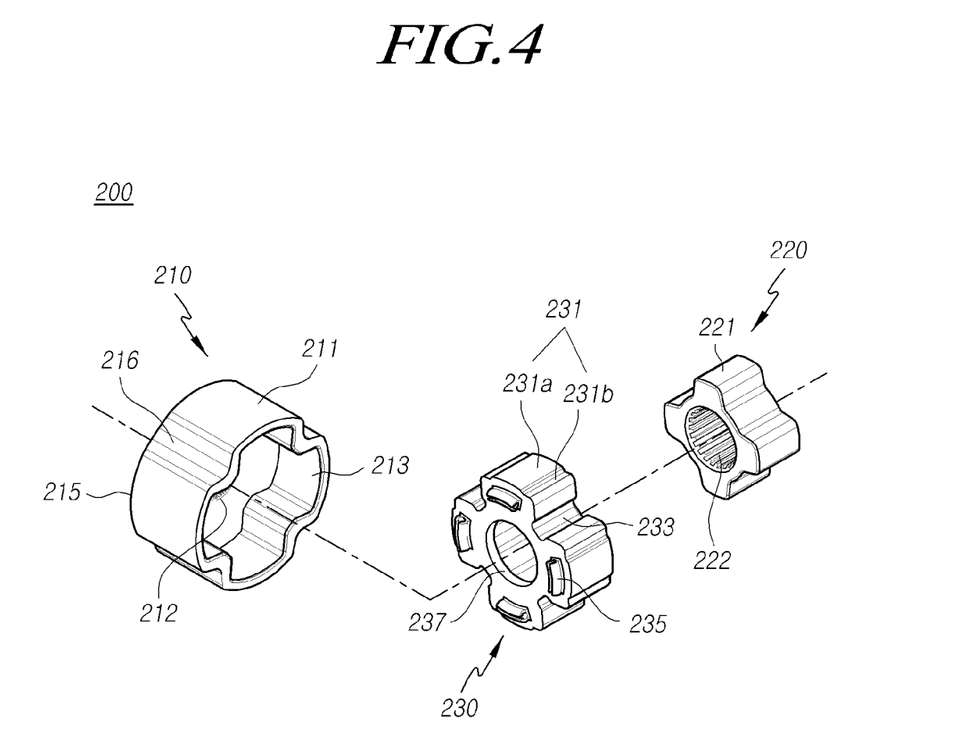
FIG. 4 is an exploded perspective view of the power transmission device of the steering apparatus according to aspects of the present disclosure.
Figure 5:
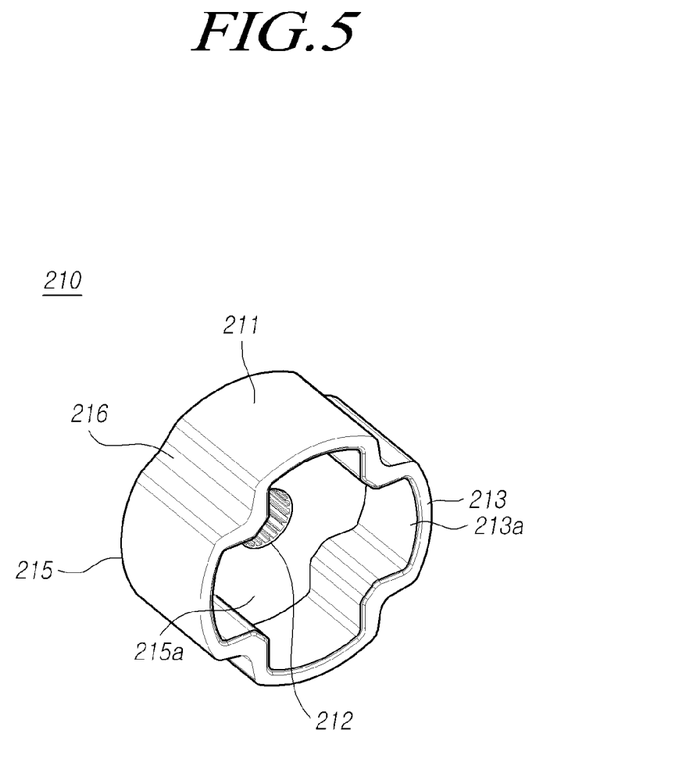
FIG. 5 is a perspective view of a first coupling member of the power transmission device of the steering apparatus according to aspects of the present disclosure.
Figure 6:
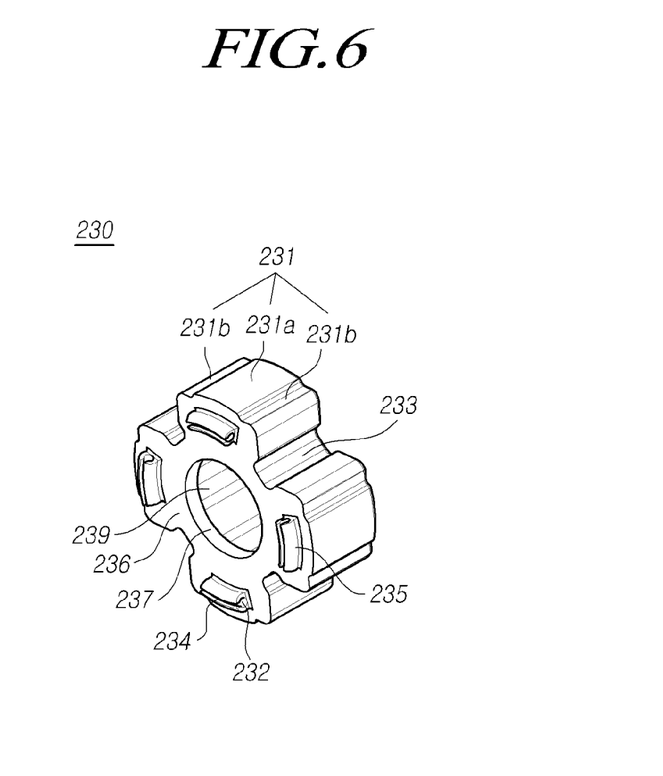
Figure 7:
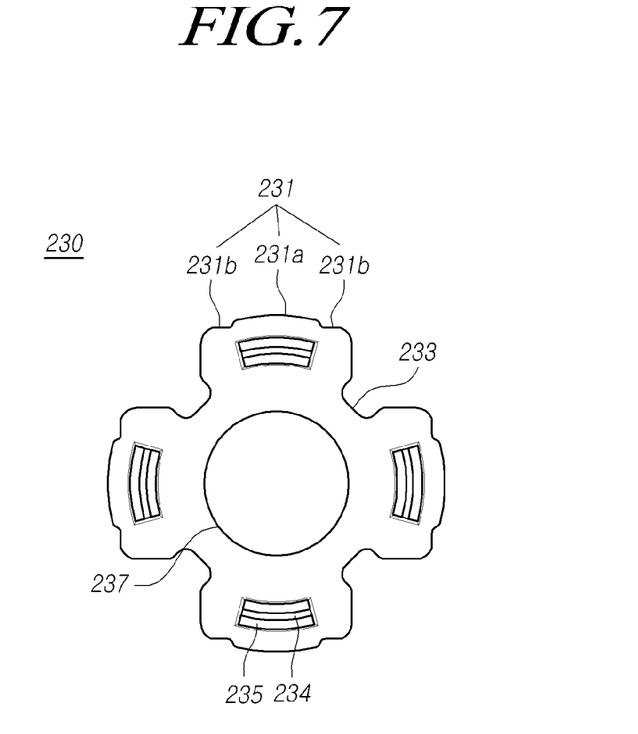
FIG. 7 is a front view of a portion of the power transmission device of the steering apparatus according to aspects of the present disclosure.
Figures 8A, 8B:
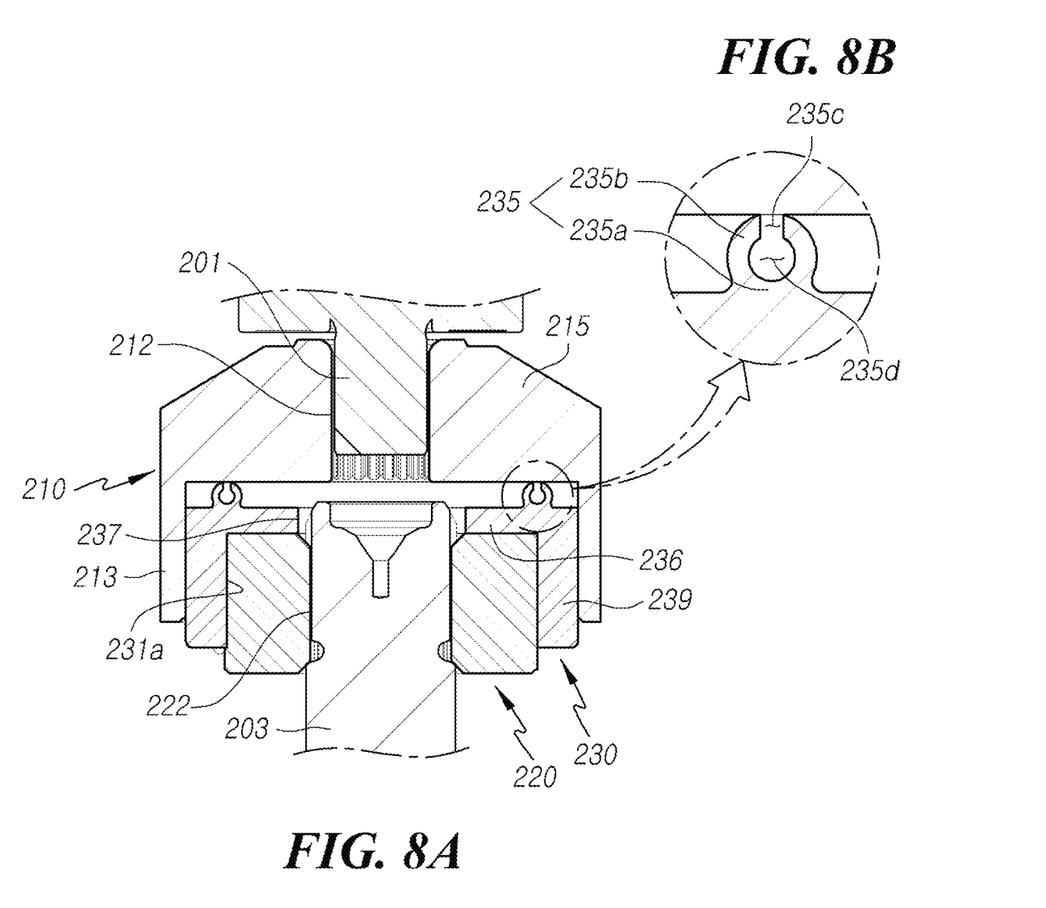
FIG. 8A is a cross-sectional view of a portion of the power transmission device of the steering apparatus according to aspects of the present disclosure.
FIG. 8B is an enlarged view of a region of the cross-sectional view of the portion of the power transmission device of the steering apparatus as shown in FIG. 8A according to aspects of the present disclosure.
Figure 9:
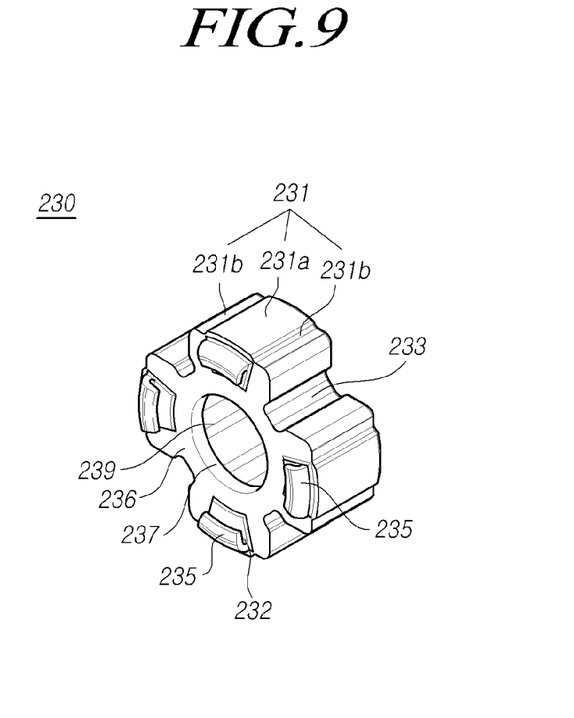
FIG. 9 is a perspective view of a portion of the power transmission device of the steering apparatus according to aspects of the present disclosure.
Figures 10A, 10B:
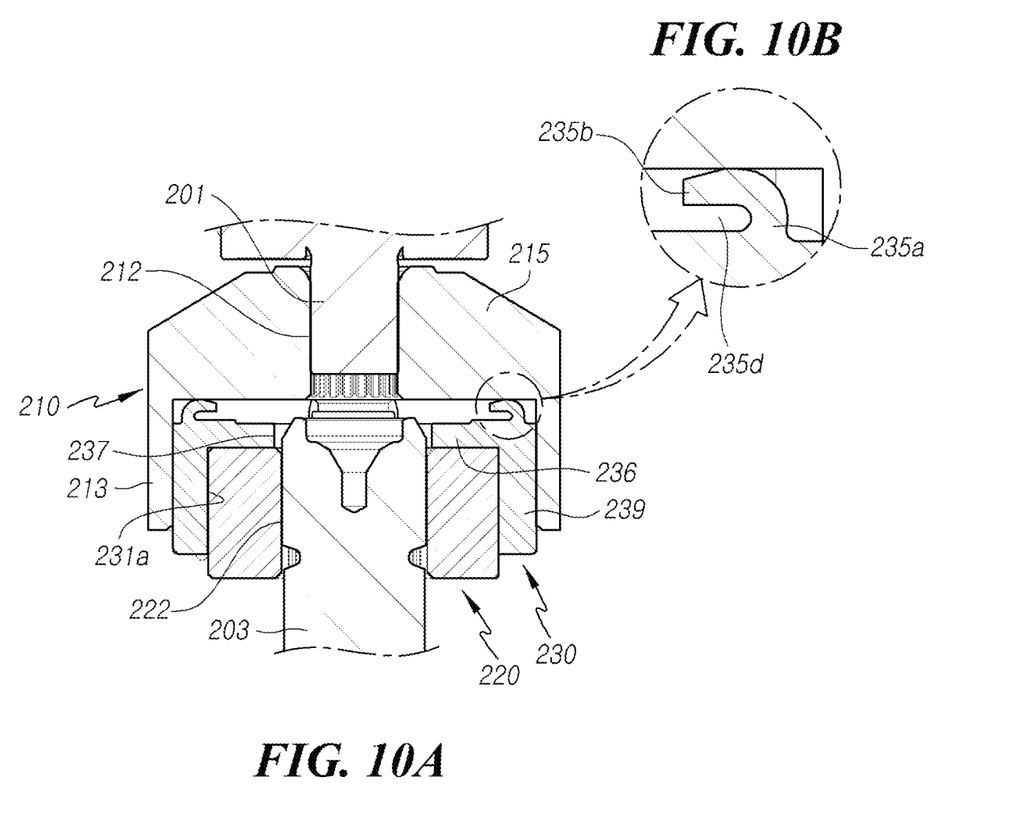
FIG. 10A is a cross-sectional view of a portion of the power transmission device of the steering apparatus according to aspects of the present disclosure.
FIG. 10B is an enlarged view of a region of the cross-sectional view of the portion of the power transmission device of the steering apparatus as shown in FIG. 10A according to aspects of the present disclosure.
Figure 11A:
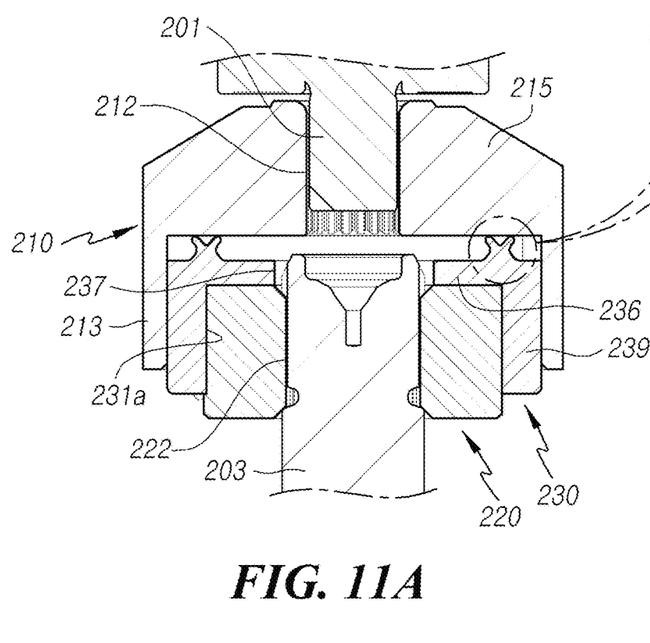
FIG. 11A is a cross-sectional view of a portion of the power transmission device of the steering apparatus according to aspects of the present disclosure.
Figure 11B:
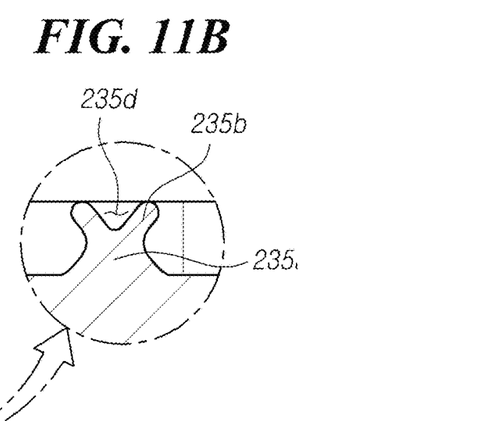
FIG. 11B is an enlarged view of a region of the cross-sectional view of the portion of the power transmission device of the steering apparatus as shown in FIG. 11A according to aspects of the present disclosure.

FIG. 1 schematically illustrates a steering apparatus according to aspects of the present disclosure; FIG. 2 is an exploded perspective view of a power transmission device of the steering apparatus according to aspects of the present disclosure; FIG. 3A is a cross-sectional view of a motor with the power transmission device of the steering apparatus according to aspects of the present disclosure; FIG. 3B is an enlarged view of a portion of the cross-sectional view of the motor with the power transmission device of the steering apparatus as shown in FIG. 3A according to aspects of the present disclosure; FIG. 4 is an exploded perspective view of the power transmission device of the steering apparatus according to aspects of the present disclosure; FIG. 5 is a perspective view of a first coupling member of the power transmission device of the steering apparatus according to aspects of the present disclosure; FIG. 6 is a perspective view of an intermediate member of the power transmission device of the steering apparatus according to aspects of the present disclosure; FIG. 7 is a front view of a portion of the power transmission device of the steering apparatus according to aspects of the present disclosure; FIG. 8A is a cross-sectional view of a portion of the power transmission device of the steering apparatus according to aspects of the present disclosure; FIG. 8B is an enlarged view of a region of the cross-sectional view of the portion of the power transmission device of the steering apparatus as shown in FIG. 8A according to aspects of the present disclosure; FIG. 9 is a perspective view of a portion of the power transmission device of the steering apparatus according to aspects of the present disclosure; FIG. 10A is a cross-sectional view of a portion of the power transmission device of the steering apparatus according to aspects of the present disclosure; FIG. 10B is an enlarged view of a region of the cross-sectional view of the portion of the power transmission device of the steering apparatus as shown in FIG. 10A according to aspects of the present disclosure; FIG. 11A is a cross-sectional view of a portion of the power transmission device of the steering apparatus according to aspects of the present disclosure; and FIG. 11B is an enlarged view of a region of the cross-sectional view of the portion of the power transmission device of the steering apparatus as shown in FIG. 11A according to aspects of the present disclosure.

As shown in these figures, the power transmission device 200 of the steering apparatus according to aspects of the present disclosure includes a first coupling member 210 that includes a first large-diameter portion 211 that radially protrudes, and a first coupling hole 212 formed at the central portion of the first coupling member 210, and is coupled to either one of a first shaft 201 and a second shaft 203; a second coupling member 220 that includes a second large-diameter portion 221 radially protruding at a location corresponding to the first large-diameter portion 211, and a second coupling hole 222 formed in the central portion of the second coupling member 220, and is coupled to the other of the first shaft 201 and the second shaft 203; an intermediate member 230 that includes an insertion end 231 coupled between the first large-diameter portion 211 and the second large-diameter portion 221, and an elastic protrusion 235 that is located on an axial end face of the intermediate member 230, supported on an inner side surface 215a of the first coupling member 210, and elastically deformable, and is coupled between the first and second coupling members 210 and 220.

The power transmission device 200 may be coaxially connected with the first shaft 201 that is rotatable through a connection with a power source such as a motor, a pump, and the like, and transfer rotational force (i.e. torque) from the power source to the second shaft 203. Hereinafter, embodiments of the power transmission device of the steering apparatus according to aspects of the present disclosure will be described by focusing on, but not limited to, an electrical power assisted steering apparatus including a motor shaft as the first shaft 201 and a worm shaft as the second shaft 203.

Further, discussions are conducted on, but not limited to, embodiments in which the first coupling member 210 is coupled to the first shaft 201, and the second coupling member 220 is coupled to the second shaft 203.

In these cases, it is to be noted that the power transmission device 200 can be used as a power connecting apparatus for assisting the steering force of a driver, by connecting between a shaft of a motor configured to generate assist power for the electrical power assisted steering apparatus and a worm shaft, and transferring the assist power generated by the motor to a steering shaft coupled to the worm wheel.

Here, as shown in FIG. 1, the electrical power assisted steering apparatus includes a steering mechanism 100 mechanically connected from a steering wheel 101 to both wheels 108, and an assist power device 120 for supplying steering assist power to the steering mechanism 100.

The steering mechanism 100 may include a steering shaft 102. One side of the steering shaft 102 may be connected with the steering wheel 101 for rotating together with the steering wheel 101, and the other side thereof may be connected with a pinion shaft 104 via a pair of universal joints 103.

Further, the pinion shaft 104 may be connected with a rack bar through a rack-and-pinion assembly 105, and both ends of the rack bar may be connected to vehicle wheels 108 through a tie rod 106 and a knuckle arm 107. Since the rack-and-pinion assembly 105 results from engagement of a pinion gear 111 formed on the pinion shaft 104 and a rack gear 112 formed on one side of the outer circumferential surface of the rack bar, as a driver turns the steering wheel 101, a torque can be generated through the steering mechanism 100, and thereby, the wheels 108 can be steered through the rack-and-pinion assembly 105 and the tie rod 106 by the torque.

The assist power device 120 may include a torque sensor 125 for detecting a torque applied to the steering wheel 101 by a driver and generating an electric signal proportional to the applied torque, an electronic control unit (ECU) 123 for generating a control signal based on the electric signal transmitted from the torque sensor 125, a motor 130 for generating assist power based on the signal transmitted from the electronic control unit, and a reducer 140 for transferring the assist power supplied by the motor 130 to the steering shaft 102.

Here, as shown in FIGS. 2 to 10, for enabling the power transmission device 200 to transfer power through a coaxial connection between the first shaft 201 and the second shaft 203, the first coupling member 210 and the second coupling member 220 of the power transmission device 200 may be coupled to the first shaft 201 and the second shaft 203, respectively, and the intermediate member 230 may be coupled between the first coupling member 210 and the second coupling member 220.

The first shaft 201, which is the motor shaft, may be supported by a first housing 207 via a first bearing 202, and the second shaft 203, which is the worm shaft, may be supported by a second housing 205 via a second bearing 204. The first shaft 201 and the second shaft 203 can be coupled to each other via the power transmission device 200.

The first coupling member 210 may include one or more first large-diameter portions 211 that radially protrude and are circumferentially spaced apart from one another, and the first coupling hole 212 coupled to the first shaft 201 and formed to pass through the central portion of the first coupling member 210.

Further, one or more depression portions 216 formed to be radially stepped down relative to the outer peripheral surface of the first large-diameter portion 211 may each be formed between first large-diameter portions 211 adjacent to each other. Thus, the first large-diameter portions 211 and the depression portions (216) are radially alternately arranged.

A serration axially formed on the inner circumferential surface of the first coupling hole 212 may be coupled with a serration axially formed on the first shaft 201, which is formed to correspond to the serration of the first coupling hole 212. Thereby, it is possible to prevent the first shaft 201 from idling when the first shaft 201 rotates.

The second coupling member 220 may include one or more second large-diameter portions 221 that radially protrude at locations corresponding to the one or more first large-diameter portions 211 and are circumferentially spaced apart from one another, and the second coupling hole 222 formed to axially pass through the central portion of the second coupling member 220.

A serration axially formed on the inner circumferential surface of the second coupling hole 222 may be coupled with a serration axially formed on the second shaft 203, which is formed to correspond to the serration of the second coupling hole 222. Thereby, it is possible to prevent the second shaft 203 from idling when the second shaft 203 rotates.

The first coupling member 210 may include a cylinder portion 213 in which the intermediate member 230 and the second coupling member 220 are inserted, and a radial portion 215 inwardly extending from an inner circumferential end of the cylinder portion 213 and having the first coupling hole 212 in the central portion thereof.

Further, the intermediate member 230 coupled between the first coupling member 210 and the second coupling member 220 may include one or more insertion ends 231 each coupled between the first large-diameter portion 211 and the second large-diameter portion 221, and one or more elastic protrusions 235 that are located on an axial end face of the intermediate member 230, supported on the inner side surface 215a of the first coupling member 210, and elastically deformable.

One or more protruding ends 231a formed to radially protrude may be circumferentially formed on the outer circumferential surfaces of the one or more insertion ends 231. Thereby, when the intermediate member 230 is coupled to the first coupling member 210, while being elastically compressed, the protruding ends 231a can support the inner circumferential surfaces of the first large-diameter portions 211, leading impact and noise to be absorbed.

Further, one or more stepped-down portions 231b, which are formed on both circumferential sides of the one or more protruding ends 231a to be radially stepped down relative to the circumferential sides, are formed on the outer circumferential surface of the one or more insertion ends 231. Thereby, while being radially elastically compressed, the protruding ends 231a can absorb deformations resulting from circumferentially expanding from both sides thereof.

Therefore, when the first coupling member 210 and the intermediate member 230 are coupled, it is possible to effectively absorb assembly errors or manufacturing errors in the radial and/or circumferential directions, and at the same time, rigidly maintain the coaxial connection of the first shaft 201 and the second shaft 203.

Further, the intermediate member 230 may include one or more inward depression portions 233, each of which is formed between the insertion ends 231 circumferentially adjacent to each other, and formed to be radially stepped down relative to the insertion ends 231.

Here, while the first shaft 201 and the second shaft 203 become engaged with each other and rotate, when an impact load deviating from the corresponding coaxial connection is input, the inward depression portion 233 can enable the insertion end 231 to be easily elastically deformed in the circumferential and radial directions. Thereby, it is possible to effectively absorb corresponding vibration and noisy sound, and prevent the first coupling member 210 and the second coupling member 220 from being deformed or damaged.

Further, in particular, as the thermal expansion of the intermediate member 230 at high temperature can be absorbed through the expansion of the inward depression portion 233 in the circumferential direction, it is possible to maintain rigidity without vibration or noisy sound and to absorb noise caused by heat or impact while the rotational force is transferred from the first shaft 201 to the second shaft 203.

The intermediate member 230 may include a cylindrical wall 239 into which the second coupling member 220 is inserted, and a radial wall 236 inwardly extending from a circumferential end of the cylindrical wall 239 and having a through hole 237 formed in the central portion thereof. The insertion ends 231, the protruding ends 231a, the stepped-down portions 231b, the inward depression portions 233, and the like may be formed on the outer surface of the cylindrical wall 239, and the elastic protrusions 235 may be formed on the outer surface of the radial wall 236.

The elastic protrusions 235 formed on the axial end face of the intermediate member 230, that is, formed on the outer surface of the radial wall 236, may be formed to be circumferentially spaced apart from one another. For example, as shown in figures, each elastic protrusion 235 may be disposed in each of four insertion ends 231.

Each elastic protrusion 235 may be formed to axially protrude from an axial end face of each of the insertion ends 231, and thus, be coupled while being elastically compressed when being assembled. Therefore, impact and load in the axial direction can be effectively absorbed.

Further, an empty space 235d is provided between an axial edge of the elastic protrusion 235 and an area connected with the insert ion end 231. Thereby, even if abrasion or permanent deformation of the intermediate member 230 occurs in a situation where durability is degraded, in addition to the absorption of axial impact and load, elastic restoring force of the elastic protrusion 235 can be remained at a certain level or more.

As shown in FIGS. 6 to 8, the elastic protrusion 235 may include a connection protrusion 235a that is connected to the axial end face of the insertion end 231 and axially protrudes, and a pair of support protrusions 235b: branched to both sides from an edge of the connection protrusion 235a; spaced apart from each other for forming a space 235d therebetween; having an opening 235c that is formed between edges of the pair of support protrusions 235b and is in communication with the space 235d; and elastically supported on the inner side surface 215a of the first coupling member 210.

As the connection protrusion 235a has a larger cross-sectional area than the pair of support protrusions 235b, thus, high rigidity can be ensured for supporting the elastic deformation of the pair of support protrusions 235b between the insertion end 231 and the pair of support protrusions 235b.

Here, edges of the pair of support protrusions 235b may be formed to be inwardly curved toward each other so that the size of the opening 235c to be smaller than that of the space 235d.

Further, the opening 235c of the pair of support protrusions 235b may be located on the inner side surface 215a of the first coupling member 210, and the pair of support protrusions 235b may be formed in a cylindrical cross-sectional shape in which the space 235d is provided.

Accordingly, as the pair of support protrusions 235b, which have relatively low rigidity compared with the connection protrusion 235a, is assembled in a situation where elastic deformation of the pair of support protrusions 235b is made, thereby, vibration and noise can be absorbed. Further, when a strong impact is transferred from the outside, such an impact can be absorbed as the connection protrusion 235a becomes elastically deformed.

As shown in FIGS. 9 to 10, the elastic protrusion 235 may include a connection protrusion 235a that is connected to the axial end face of the insertion end 231 and axially protrudes, and a support protrusion 235b that includes an edge bent toward a certain location in the radial direction, that is, radially inwardly bent, from an edge of the connection protrusion 235a for forming a space 235d therein, and is elastically supported on the inner side surface 215a of the first coupling member 210.

In order for an edge of the support protrusion 235b to be spaced apart from the inner side surface 215a of the first coupling member 210, an outer side surface of the support protrusion 235b that is supported on the first coupling member 210 may be formed to have an outwardly-curved shape, and thereby, when the first shaft 201 and the second shaft 203 rotate, it is possible to minimize abrasion etc. due to excessive contact between the support protrusion 235b and the first coupling member 210 and reduce friction noise.

In addition, as an inner side surface of a portion of the connection protrusion 235a connected to the support protrusion 235b, that is, the inner side surface forming the space 235d resulting from the surrounding of the radial wall 236 in which the through hole 237 of the intermediate member 230 is formed and the support protrusion 235b is formed to have a curved shape, elastic deformation of the support protrusion 235b can be continued in a situation where durability is degraded.

As shown in FIG. 11, the elastic protrusion 235 may include a connection protrusion 235a that is connected to the axial end face of the insertion end 231 and axially protrudes, and a pair of support protrusions 235b that include edges slantingly bent to both radial sides from an edge of the connection protrusion 235a for forming a space 235d therebetween, and is elastically supported on the inner side surface 215a of the first coupling member 210.

In this case, as a thickness of each of the pair of support protrusions 235b is smaller than a thickness of the connection protrusion 235a, the pair of support protrusions 235b can be assembled in a situation where elastic deformation of the pair of support protrusions 235b is made, and thereby, vibration and noisy sound can be absorbed Further, when a strong impact is transferred from the outside, such an impact can be absorbed as the connection protrusion 235a becomes elastically deformed.

Therefore, when the first shaft 201 and the second shaft 203 are engaged and rotate normally, vibration and noisy sound can be absorbed by elastic support force of the pair of support protrusion 235b, and when a strong impact is transferred from the outside, such as unevenness of the road surface, such an impact can be absorbed by the elastic support force greater than the connection protrusion 235a.

The first coupling member 210 and the second coupling member 220 may include a metal material such as steel, or an engineering plastic-based material such as polyacetal (POW, polyamide (PA), polycarbonate (PC), polyimide (PI), polybutylene terephthalate (PBT), and the like.

In addition, in order to have weather resistance and flexibility along with elasticity, the intermediate member 230 may include a material such as natural rubber (NR), nitrile butadiene rubber (NBR), chloroprene rubber (CR), ethylene propylene terpolymer (EPDM), fluoro rubber (FPM), styrene butadine rubber (SBR), chlorosulphonated polyethylene (CSM), urethane, and silicone, and the like, and function as a damper to absorb noisy sound and vibration.

According to the structures and shapes of the embodiments described herein, it is possible to provide the power transmission devices of steering apparatuses capable of: compared to the conventional power transmission device, transferring rotational force from the first shaft to the second shaft while maintaining rigidity without vibration or noisy sound; absorbing noise caused by heat or impact; and enhancing durability.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A power transmission device of a steering apparatus comprising:
    a first coupling member that includes a first large-diameter portion that radially protrudes and a first coupling hole formed at a central portion of the first coupling member, and is coupled to either one of a first shaft and a second shaft;
    a second coupling member that includes a second large-diameter portion radially protruding at a location corresponding to the first large-diameter portion and a second coupling hole formed in a central portion of the second coupling member, and is coupled to the other of the first shaft and the second shaft; and
    an intermediate member that includes an insertion end coupled between the first large-diameter portion and the second large-diameter portion, and an elastic protrusion that is disposed on an axial end face of the intermediate member, supported on an inner surface of the first coupling member, and elastically deformable, and is coupled between the first and second coupling members,
    wherein a protruding end that radially protrudes is circumferentially disposed on an outer circumferential surfaces of the insertion end, and
    wherein a stepped-down portion disposed on both circumferential sides of the protruding end to be radially stepped down relative to the circumferential sides is disposed on the outer circumferential surface of the insertion end.

2. The power transmission device of the steering apparatus according to claim 1, wherein a serration is axially disposed on an inner circumferential surface of the first coupling hole.

3. The power transmission device of the steering apparatus according to claim 1, wherein the first coupling member comprises:
    a cylinder portion in which the intermediate member and the second coupling member are inserted; and
    a radial portion inwardly extending from an inner circumferential end of the cylinder portion and having the first coupling hole in the central portion the first coupling member.

4. The power transmission device of the steering apparatus according to claim 1, wherein a serration is axially disposed on an inner circumferential surface of the second coupling hole.

5. The power transmission device of the steering apparatus according to claim 1, wherein the insertion end includes a plurality of insertion ends, and the intermediate member includes one or more inward depression portions between the plurality of insertion ends circumferentially adjacent to each other to be radially stepped down relative to the plurality of insertion ends.

6. The power transmission device of the steering apparatus according to claim 1, wherein the elastic protrusion includes a plurality of elastic protrusions circumferentially spaced apart from one another.

7. The power transmission device of the steering apparatus according to claim 1, wherein the elastic protrusion includes a plurality of elastic protrusions, and the insertion end includes a plurality of insertion ends, and wherein each of the plurality of elastic protrusions axially protrudes from an axial end face of each of the plurality of insertion ends.

8. The power transmission device of the steering apparatus according to claim 7, wherein the elastic protrusion has a space between an axial edge of the elastic protrusion and an area connected with the insertion end.

9. The power transmission device of the steering apparatus according to claim 8, wherein the elastic protrusion comprising:
    a connection protrusion that is connected to the axial end face of the insertion end and axially protrudes; and
    a pair of support protrusions that is branched to both sides from an edge of the connection protrusion, is spaced apart from each other for forming the space, has an opening that is formed between edges of the pair of support protrusions and is in communication with the space, and is elastically supported on the inner side surface of the first coupling member.

10. The power transmission device of the steering apparatus according to claim 9, wherein edges of the pair of support protrusions are formed to be inwardly curved toward each other so that a size of the opening becomes smaller than that of the space.

11. The power transmission device of the steering apparatus according to claim 9, wherein the opening is located on the inner side surface of the first coupling member, and the pair of support protrusions has a cylindrical cross-sectional shape in which the space is provided.

12. The power transmission device of the steering apparatus according to claim 8, wherein the elastic protrusion comprising:
   a connection protrusion that is connected to the axial end face of the insertion end and axially protrudes; and
   a support protrusion that includes an edge bent toward a certain location in a radial direction from an edge of the connection protrusion for forming the space, and is elastically supported on the inner side surface of the first coupling member.

13. The power transmission device of the steering apparatus according to claim 12, an outer side surface of the support protrusion supported on the inner side surface of the first coupling member has an outwardly-curved surface so that an edge of the support protrusion is spaced apart from the inner side surface of the first coupling member.

14. The power transmission device of the steering apparatus according to claim 12, wherein an area of the connection protrusion connected with the support protrusion has a curved shape.

15. The power transmission device of the steering apparatus according to claim 8, wherein the elastic protrusion comprising:
   a connection protrusion that is connected to the axial end face of the insertion end and axially protrudes; and
   a pair of support protrusions that includes edges slantingly bent to both radial sides from an edge of the connection protrusion for forming the space, and is elastically supported on the inner side surface of the first coupling member.

16. The power transmission device of the steering apparatus according to claim 15, wherein a thicknesses of each of the pair of support protrusions is smaller than a thicknesses of the connection protrusion.

17. A power transmission device of a steering apparatus comprising:
   a first coupling member that includes a first large-diameter portion that radially protrudes and a first coupling hole formed at a central portion of the first coupling member, and is coupled to either one of a first shaft and a second shaft;
   a second coupling member that includes a second large-diameter portion radially protruding at a location corresponding to the first large-diameter portion and a second coupling hole formed in a central portion of the second coupling member, and is coupled to the other of the first shaft and the second shaft; and
   an intermediate member that includes an insertion end coupled between the first large-diameter portion and the second large-diameter portion, and an elastic protrusion that is disposed on an axial end face of the intermediate member, supported on an inner surface of the first coupling member, and elastically deformable, and is coupled between the first and second coupling members,
   wherein the elastic protrusion includes a plurality of elastic protrusions, and the insertion end includes a plurality of insertion ends, and wherein each of the plurality of elastic protrusions axially protrudes from an axial end face of each of the plurality of insertion ends,
   wherein the elastic protrusion has a space between an axial edge of the elastic protrusion and an area connected with the insertion end, and
   wherein the elastic protrusion comprising:
      a connection protrusion that is connected to the axial end face of the insertion end and axially protrudes; and
      a pair of support protrusions that is branched to both sides from an edge of the connection protrusion, is spaced apart from each other for forming the space, has an opening that is formed between edges of the pair of support protrusions and is in communication with the space, and is elastically supported on the inner side surface of the first coupling member.

* * * * *